Nov. 8, 1966  A. J. GRANBERG  3,283,575
TEMPERATURE COMPENSATING COUPLING FOR METERS
Filed Aug. 26, 1963  2 Sheets-Sheet 1

INVENTOR.
ALBERT J. GRANBERG
BY
Fryer & Tjensvold
ATTORNEYS

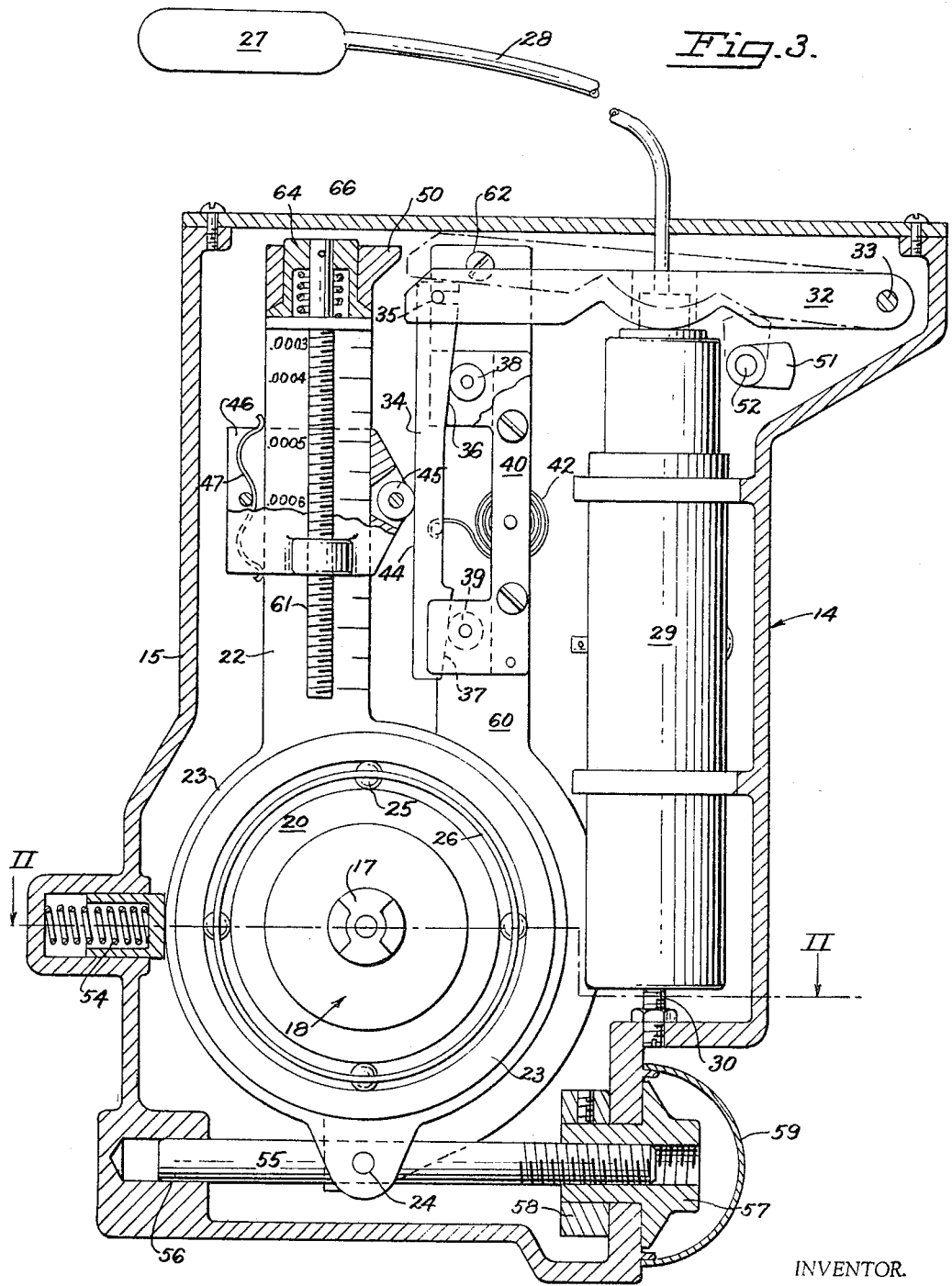

United States Patent Office 3,283,575
Patented Nov. 8, 1966

3,283,575
TEMPERATURE COMPENSATING COUPLING
FOR METERS
Albert J. Granberg, Oakland, Calif., assignor to Cal-
Meter Co., Emeryville, Calif., a corporation of Cali-
fornia
Filed Aug. 26, 1963, Ser. No. 304,337
9 Claims. (Cl. 73—233)

This invention relates to liquid meters and particularly to meters which automatically compensate for the difference in specific gravity of a liquid at different temperatures.

Meters are known, as for example in the engine fuel industry, which include an infinitely variable speed coupling between a meter unit and a counter unit and means to adjust the coupling in response to changes in temperature or specific gravity of the liquid being metered. Examples of such meters are disclosed in the Granberg Patent No. 2,806,374 where a temperature sensitive adjusting means is employed and in the patent to Granberg et al. No. 3,020,758 in which the adjustment is responsive to specific gravity. Since one meter may be employed for metering different types of fuels, it is desirable that it be adjustable or capable of being set for use with any type of fuel because the coefficient of expansion varies greatly, for example, from .0003 per degree Fahrenheit for certain residual fuels and oils to .0007 for lighter fuels such as aviation gasoline at a reference temperature of 60° F.

It is the object of the present invention to provide an improved temperature compensating coupling for liquid meters with means to effect simple and positive adjustment for use with liquids having different coefficients of expansion.

Further and more specific objects and advantages of the invention are made apparent in the following specification wherein the invention is described in detail by reference to the accompanying drawings.

In the drawings:

FIG. 3 is a horizontal sectional view taken on the line III—III of FIG. 2.

Figure 1:
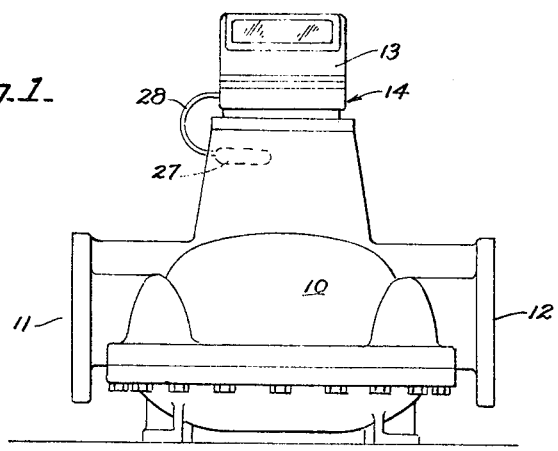
FIG. 1 is a view in elevation of a liquid meter including the temperature compensating coupling of the present invention.

The invention as illustrated in FIG. 1 is associated with a meter having a housing 10 enclosing a rotatable meter component, not shown, and having an inlet end 11 and discharge end 12. Rotation of the meter is imparted to a counter element 13 which serves to record the quantity of fluid which flows through the meter, and in the present case, the meter and counter are coupled together through a temperature compensating coupling, generally indicated at 14, and the components of which are illustrated in the enlarged views of FIGS. 2 and 3. The compensator is firmly connected between the meter and counter by cap screws or the like, not shown, and comprises a housing 15 with a shaft 16 adapted to be coupled to the rotor of the meter and a shaft 17 adapted to be coupled in driving relationship with the counter. The shafts 16 and 17 are coupled to each other with an infinitely variable transmission mechanism generally indicated at 18. This mechanism will not be described herein in detail since it may be one of several known types, one of which for example is described in the above mentioned Patent No. 2,806,374. It will suffice for an understanding of the present invention to know that this transmission comprises discs driving each other through one-way clutches and through pin and slot connections with a central disc illustrated at 20 capable of being adjusted from side to side in order to vary the ratio of drive through the pin and slot connections.

Figure 2:
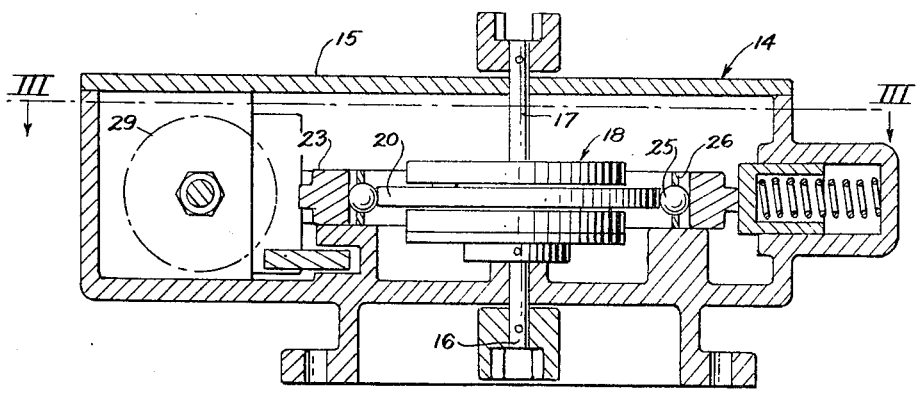
FIG. 2 is a sectional view of the temperature compensating coupling taken on the line II—II of FIG. 3.

Adjustment of the central transmission disc 20 is accomplished in accordance with the present invention by a lever 22 (see FIG. 3) including a ring 23 and pivoted for slight swinging movement on a pin 24. The ring 23, as best shown in FIG. 2, is concentrically spaced from the disc 20, the free turning movement of which is facilitated by balls 25 shown as four in number and held in spaced relationship around the circumference of the disc 20 by a ball cage ring 26. Thus by swinging movement of the lever 22 to the right or left as viewed in FIG. 3, the disc 20 is caused to move to the right or left and vary the drive ratio between the meter and the counter driven thereby through the transmission. This swinging movement of the lever 22 is effected in response to temperature of fluid passing through the meter as sensed by a bulb 27 shown in FIG. 1 as disposed within the meter and connected by a tube 28 with a bellows type expansible element shown at 29 in FIG. 3. The details of construction of the expansible element 29 are unnecessary to an understanding of the present invention, but it is of a well known make including means for making automatic correction for ambient temperature so that the temperature of the air within the housing does not affect a true reading of temperature of the fluid in the meter and in the bulb 27. Variation of volume of fluid in the bulb and expansible member therefore vary the overall length of the member.

As also shown in FIG. 3, the expansible member abuts an adjustable element 30 at one end and a lever 32 at the other end. The lever 32 is pivoted as at 33 and its opposite end is linked to a gib 34 by a pin and slot connection indicated at 35. The gib 34 has a pair of inclined portions 36 and 37 on one edge bearing on rollers 38 and 39 in a bracket 40 within which it is slidably received, and it is urged in one direction, that is downwardly as viewed in FIG. 3, by a spring 42 while expansion of the element 29 urges it in the opposite direction. Due to the inclined surfaces 36 and 37, movement lengthwise of the gib 34 also imparts slight sidewise movement thereto and its edge 44 bears against and moves the lever 22 by an adjustable anti-friction device. This device includes a roller 45 carried in a frame 46 which is slidable on the lever and urged to a snug fit thereon by a spring 47. Thus expansion and contraction of the expansible member 29 in response to variations in temperature of the liquid passing through the meter imparts a swinging movement of the lever 22 and adjustment of the disc 20 to compensate the reading of the counter 13 for liquids of different temperatures.

The original setting or checking the calibration of the meter for liquid of a given type and at a reference temperature is accomplished by fixing the position of the free end of the lever 22 and adjusting the pivot of the lever 24 to the position required for producing an accurate reading on the counter. To accomplish this, lever 32 normally actuated by the expansible member 29 is swung away from the expansible member to the dotted line position shown where its end acts as a stop for a toe 50 on the free end of the lever 22. This swinging movement of the lever 32 may be accomplished by a cam 51 on the shaft 52 which may be rotated from the exterior of the housing to bring the cam to its dotted line position and serves to disconnect the temperature sensing mechanism. The ring portion 23 of the lever 22 is urged toward the right by a spring 54 and with the free end of the lever engaging the stop as described, the position of the pivot 24 thereof may be varied by sliding a rod 55 through which the pivot extends. One end of the rod is slidably supported in the housing as indicated at 56 and the other end is threaded and received in a nut 57 held against longitudinal movement by a collar 58. Thus rotation of the nut adjusts the position of the pivot 24. The nut may be protected from tampering as by a small removable cover 59.

The lever 22 which carries the slidable roller frame 46 should always be maintained substantially in parallelism with the straight edge of the gib 34 against which the roller 45 bears. To maintain such parallelism during adjustment of the pivot point 24 of the lever, the bracket 40 within which the gib slides is secured to a lever 60, one end of which is pivoted to the same pin 24 which adjustably supports the lever 22. The opposite end of the lever 60 is pivotally supported to the housing as by a screw 62. Consequently when adjustments are being made with the toe 50 of lever 22 resting upon a lever 32 in its broken line position and the end of lever 60 fixed by pivot point 62, both levers are adjusted simultaneously and substantial parallelism is maintained.

When it is desired to change or reset the compensating coupling for metering liquids with different coefficients of expansion, the frame 46 which carries the roller 45 is adjusted longitudinally of the lever 22 so that the roller bears against the gib 34 at a different position. This is accomplished by turning a rotatable knob 64 disposed adjacent the end of the lever 22 and fixed to a threaded rod 65 which extends through and is threadedly connected with the frame 46. The lever may have suitable calibrations thereon as shown indicating the position of adjustment for any particular type of liquid. A spring 66 prevents back lash in this threaded adjustment.

By changing the position of the roller 45, the effective moment arm of the lever 22 is also changed as will be the adjustment of the variable transmission between the meter and its counter for any given increment of movement of the gib.

I claim:

1. In a temperature compensating coupling for use between a liquid meter and a counter driven thereby, said coupling including a variable transmission with a movable element controlling the ratio of drive therethrough, a pivoted lever having a part embracing said movable element, an anti-friction member carried by the lever and adjustable to and away from lever pivot, a gib supported for sliding movement substantially parallel to the lever and having an edge engaging the anti-friction member, said gib having cam means at its opposite edge to effect movement of the lever when the gib slides, and temperature sensitive expansible means for imparting sliding movement to the gib.

2. The combination of claim 1 in which the sliding support for the gib is carried on a second lever substantially parallel to the first lever with a fixed pivot at one end and a pivot coaxial and adjustable with the pivot of the first named lever adjacent its other end.

3. The combination of claim 2 in which the temperature sensitive expansible means transmits movement to the gib through a third lever, and means to adjust said third lever during calibration of the coupling to a position out of contact with the expansible means and to a position to limit swinging movement of the first named lever.

4. The combination of claim 1 in which the movable element of the transmission is a disc, and including an annulus on said lever embracing the disc, anti-friction balls between the disc and annulus, and a ball cage ring holding said balls in spaced relationship about the circumference of the disc.

5. The combination of claim 4 in which the sliding support for the gib is carried on a second lever substantially parallel to the first lever with a fixed pivot at one end, and a pivot coaxial and adjustable with the pivot of the first named lever adjacent its other end.

6. The combination of claim 5 in which the temperature sensitive expansible means transmits movement to the gib through a third lever, and means to adjust said third lever during calibration of the coupling to a position out of contact with the expansible means and to a position to limit swinging movement of the first named lever.

7. The combination of claim 1 in which the temperature sensitive expansible means transmits movement to the gib through a third lever, and means to adjust said third lever during calibration of the coupling to a position out of contact with the expansible means and to a position to limit swinging movement of the first named lever.

8. The combination of claim 7 in which the movable element of the transmission is a disc, and including an annulus on said lever embracing the disc, anti-friction balls between the disc and annulus, and a ball cage ring holding said balls in spaced relationship about the circumference of the disc.

9. In a temperature compensating coupling for use between a liquid meter and a counter driven thereby, said coupling including a variable transmission with a movable disc controlling the ratio of drive therethrough, a pivoted lever having an annulus embracing the disc, anti-friction balls between the disc and the annulus, and a ball cage ring holding said ball in spaced relationship about circumference of the disc, an anti-friction member carried by the lever and adjustable to and away from lever pivot, a second lever substantially parallel to the first lever with a fixed pivot on one end, and a pivot co-axial and adjustable with the pivot of the first named lever adjacent its other end, a gib supported for sliding movement on said second lever substantially parallel to the first lever, said gib having an edge engaging the anti-friction member and cam means at its opposite edge to effect movement of the first lever when said gib slides, temperature sensitive expansible means for imparting sliding movement to the gib through a third lever, means to adjust said third lever during calibration of the coupling to a position out of contact with the expansible means and to a position to limit swinging movement of the first named lever, and means to adjust the common pivot of said first and second levers in a direction to adjust the transmission for calibrating purposes.

References Cited by the Examiner

UNITED STATES PATENTS

| | | | |
|---|---|---|---|
| 2,208,687 | 7/1940 | Renfrew | 73—233 |
| 2,806,374 | 9/1957 | Granberg | 73—233 |
| 2,884,793 | 5/1959 | Billeter | 73—233 X |
| 3,166,937 | 1/1965 | Farrell | 73—233 |

FOREIGN PATENTS 627,982   3/1936   Germany.

RICHARD C. QUEISSER, *Primary Examiner.*

E. D. GILHOOLY, *Assistant Examiner.*